3,646,198
ORAL SYNERGIZED ANTI-INFLAMMATORY
COMPOSITIONS
Frank Eberhard Zimmerman, Mannheim, Germany, assignor to A. G. Knoll Chemische Fabriken, Ludwigshaven (Rhine), Germany
No Drawing. Filed Dec. 30, 1969, Ser. No. 889,329
Claims priority, application Germany, Jan. 2, 1969,
P 19 00 041.0
Int. Cl. A61k 27/00
U.S. Cl. 424—180    11 Claims

ABSTRACT OF THE DISCLOSURE

A pharmaceutical composition for oral administration having anti-inflammatory, anti-pyretic and analgesic properties comprising as the active ingredients escin and 1-phenyl - 2,3-dimethyl-4-(2-bicyclo[2.2.1]heptyl)-amino-3-pyrazoline-5-one in a ratio of 1 to 0.01–20 respectively and in an amount sufficient to relieve the inflammation, the ratio of the active ingredients being such as to synergize their inflammatory activities and cause their acute toxicities to be hypoadditive.

---

This invention relates to a medicinal composition having analgesic, anti-pyretic and anti-inflammatory properties comprising a synergistic admixture of a pyrazolone derivative and escin.

The Belgian Pat. 713,366 discloses that 1-phenyl-2,3-dimethyl - 4-(2-bicyclo[2.2.1]heptyl)-amino-3-pyrazoline-5-one is on alagesic, anti-pyretic and anti-inflammatory and has a central nervous system depressant action.

Escin, see The Merck Index, eighth edition (1968), p. 421, has been used topically as an analgesic to alleviate the pain of varicose veins. Its use orally is contraindicated because of incomplete absorption and undesirable side effects.

Secondary edemas are frequently accompanied by inflammation, especially those occurring as the result of venous diseases of the lower extremities. One method of treating such inflammation has been to apply escin topically to the effected areas while administering an anti-inflammatory medicament orally. Such medicaments, in most cases, must be administered over relatively long periods of time and since undesirable side effects are generally encountered, it becomes necessary to prematurely withdraw them.

It is therefore an object of the invention to provide a medicament combining a pyrazolone derivative and escin which can be administered orally and whose activity will be tolerated for a relatively long period of time with a minimum of side effects.

In accordance with this object it has been found that mixtures of 1 - phenyl-2,3-dimethyl-4-(2-bicyclo[2.2.1]-heptyl)-amino-3-pyrazoline-5-one and escin in certain ratios possess synergistic properties of the individual components, thereby permitting a substantial reduction of the concentration of the components in the mixture and improved tolerance thereof over longer periods of time. It has also been found that such compositions have considerably reduced toxicity and hence are safe for oral administration.

Tests have been conducted on the carrageenin-edema of the rat paw in accordance with the method set forth in J. Phar., and Pharmacol 16:810, 1964 by C. J. Niemeggers and J. F. Verbruggen and have been evaluated in accordance with the statistical methods described in Arzneimittel-Forschung 17:229, 1967 by D. Lorenz and E. Miller and Arzneimittel Forschung 16:329, 1966 by H. Zipf and J. Hamacher.

To begin with the dose-efficacy relationships of 1-phenyl - 2,3 - dimethyl-4-(2-bicyclo[2.2.1]heptyl)-amino-3-pyrazoline-5-one and escin were established and the median effective dose $ED_{50}$ was determined. For the pyrazolone derivative the $ED_{50}$ was found to be about 200 mg./kg. and for escin about 150 mg./kg.

Thereafter, the compounds were combined in graduated doses and various ratios and the $ED_{50}$ was determined for the various compositions. The results are given below in Table 1.

TABLE 1

[Anti-inflammatory effect on rat paw-edema following oral administration of escin and 1-phenyl-2,3-dimethyl-4-(2-bicyclo [2.2.1] heptyl)-amino-3-pyrazoline-5-one (hereinafter called "pyrazolone derivative")]

| Ratio of the mixture of escin: pyrazolone derivative | Theoretical $ED_{50}$ in mg./kg. | | Experimental $ED_{50}$ in mg./kg. | | Multiple of the additive or synergistic effect |
|---|---|---|---|---|---|
| | Escin | Pyrazolone derivative | Escin | Pyrazolone derivative | |
| 1:0.01 | 150.0 | 1.5 | 120.0 | 1.2 | 1.25 |
| 1:0.05 | 145.0 | 7.25 | 90.0 | 4.5 | 1.6 |
| 1:0.1 | 140.0 | 14.0 | 100.0 | 10.0 | 1.4 |
| 1:0.25 | 126.0 | 32.8 | 90.0 | 25.0 | 1.4 |
| 1:0.5 | 130.0 | 65.0 | 100.0 | 50.0 | 1.3 |
| 1:1.0 | 86.0 | 86.0 | 110.0 | 110.0 | 0.79 |
| 1:5.0 | 31.5 | 157.5 | 40.0 | 200.0 | 0.79 |
| 1:20.0 | 9.4 | 186.0 | 9.0 | 150.0 | 1.04 |

From these experiments it will be seen that a synergistic or hyperadditive effect results from combining 1 part of 1 - phenyl-2,3-dimethyl-4-(2-bicyclo[2.2.1]heptyl)-amino-3-pyrazoline-5-one with 5–20 parts of escin. An exceptionally favorable intensification of the anti-inflammatory effect, about the factor 1.5 to 1.6, is realized with a composition containing 1 part of the pyrazoline derivative and 10 to 20 parts of escin.

On the other hand, when the proportion is increased in favor of 1 - phenyl - 2,3-dimethyl-4-(2-bicyclo[2.2.1] heptyl)-amino-3-pyrazoline-5-one, apparently an inversion occurs and the effects become hypoadditive. Because of the synergistic or hyperadditive effect the concentration in the mixture of each component can be reduced 20–40%.

Tests were also performed to determine the lethality of the compositions. The determination of the mean lethal dose $LD_{50}$ was carried out on female albino rats weighing 160–200 g. Then animals were employed per dose.

To begin with the $LD_{50}$ of the individual components were determined. For the 1-phenyl-2,3-dimethyl-4-(2-bicyclo-[2.2.1]heptyl)-amino-3-pyrazoline-5-one, the $LD_{50}$, 48 hrs. up to 336 hrs. after a single oral administration, was found to be 2.90 mg./kg. and for the escin, 795 mg./kg.

Following this, the acute toxicity of the combined components was determined. The results are given in Table 2 below.

TABLE 2

[Lethal effect of combinations of escin and 1-phenyl-2,3-dimethyl-4-(2-bicyclo[2.2.1]heptyl)-amino-3-pyrazoline-5-one (hereinafter called "Pyrazolone Derivative")]

| Ratio of combination escin:pyrazolone | $LD_{50}$ (mg./kg.) theoretically calculated | | $LD_{50}$ (mg./kg.) experimentally determined | | Multiple of additive effect |
|---|---|---|---|---|---|
| | Escin | Pyrazolone | Escin | Pyrazolone | |
| 1:0.01 | 793 | 7.93 | 800 | 8 | 1 |
| 1:0.1 | 774 | 77.4 | 940 | 94 | 0.82 |
| 1:1 | 624 | 624 | 1,100 | 1,110 | 0.56 |
| 1:5 | 335 | 1,665 | 780 | 3,900 | 0.43 |
| 1:100 | 27.97 | 2797 | 41 | 4,100 | 0.68 |

NOTE.—The escin and the pyrazolone derivative were homogeneously emulsified with gum arabic and administered orally a single time. Observations were made 336 hours thereafter.

It will be noted from the data of Table 2 that with the composition containing 1 part escin to 0.01 part of the pyrazoline derivative, the behavior is purely additive, i.e. the calculated and experimental $LD_{50}$ are identical. With the composition containing 1 part escin to 0.1 part of the pyrazoline derivative, the toxic effect is considerably reduced and the combined lethal effects become hypoadditive. The same is true of the composition containing ratios of 1:1 and 1:5 of escin to the pyrazoline derivative. However, compositions containing 1 part of escin to 100 parts of the pyrazoline derivative, the toxic effect begins to revert towards the additive effect.

Thus, it has been established that compositions containing a ratio of escin to the pyrazoline derivative of 1 to 0.01–20 by weight, preferably 1 to 0.01, are synergistic with respect to their anti-inflammatory properties and hypoadditive with respect to their acute toxicity.

The following are non-limitative examples of pharmaceutical compositions made in accordance with the instant invention.

EXAMPLE 1

Tablets

A tablet mass is made in a conventional manner consisting of starch, a granulating agent and a lubricant. The starch may be corn or wheat starch and a portion of the starch may be replaced by purified white microcrystalline cellulose of molecular weight 30,000 to 50,000 and a particle size of 10–50µ or by polyvinylpyrrolidone. A suitable granulating agent may be 5–20% gelatine solutions, 5–10% potato starch paste solutions or 10–20% solutions of polyvinylpyrrolidone in a polar organic solvent such as ethanol, isopropanol or acetone. The lubricant can be metal soaps such as magnesium stearate or calcium arachinate, or stearin or talc-silicic acid or talc-stearin.

The active ingredients escin and 1-phenyl-2,3-dimethyl-4 - (2-bicyclo[2.2.1]heptyl)-amino-3-pyrazoline-5-one are worked into about 80 mg. of the tablet mass either in the form of a 3–5% active substance-starch trituration, as a 10% alcoholic solution, or as a 10–20% alcoholic solution of polyvinylpyrrolidone. The mass is then pressed into tablets preferably having a 6 mm. diameter, a thickness of 3 mm. and a weight of about 80 mg. Each tablet contains 2.5 mg. of the pyrazoline derivative and 25 mg. escin.

The same procedure is followed to make tablets each of which contain different amounts of ratios of the active ingredients, such as 25 mg. escin and 25 mg. of the pyrazoline derivative, 25 mg. escin and 0.25 mg. of the pyrazoline derivative, etc.

EXAMPLE 2

Coated pills

For the manufacture of coated pills containing 5 mg. 1 - phenyl - 2,3 - dimethyl - 4 - (2-bicyclo[2.2.1]heptyl)-amino-3-pyrazoline-5-one and 25 mg. escin per kernel of coated pill the following is used: 30 mg. active substance, tablet mass up to 80 mg., and uncolored sugaring mass up to 120 mg.

The kernel may be made in the same manner as the tablet mass described in Example 1 and the active ingredients therein incorporated also in the same manner as that described in that example. Preferably, the kernel diameter should be about 6 mm., its thickness about 2.9–3.0 mm. and should weigh about 80 mg. The uncolored sugar coating is applied in a conventional manner.

In a similar manner coated pills can be made containing different amounts and ratios of the active ingredients as indicated in Example 1.

While the preferred oral administration of the present anti-inflammatory composition is by way of tablets and coated pills, it will be understood that it can also be administered orally by way of solutions, emulsions, suspensions and in any other suitable form.

The dosage and length of time of administration varies with the intensity and duration of the edemous or inflamed condition. The average daily dose for adults is 120 to 250 mg. of the combined active ingredients taken orally every four hours, one or two tablets at a time containing 25–30 mg. The maintenance dose is about one tablet of about 25–30 mg. given three times daily. See "The Pharmacological Basis of Therapeutics" by Goodman and Gilman, third edition, The Macmillan Company, The Pyrazolon Derivatives, pages 335–339 which is herein incorporated by reference.

What is claimed is:

1. An anti - inflammatory pharmaceutical composition suitable for oral administration containing as the active ingredients escin and 1-phenyl-2,3-dimethyl-4-(2-bicyclo[2.2.1]heptyl)-amino-3-pyrazoline-5-one in a ratio of 1 to 0.01–20 and in an amount sufficient to relieve inflammation, in which ratio the active ingredients are synergistic with respect to their anti-inflammatory activities and hypoadditive with respect to their acute toxicities.

2. The pharmaceutical composition of claim 1 wherein the ratio of the escin to the 1-phenyl-2,3-dimethyl-4-(2-bicyclo[2.2.1]heptyl) amino - 3-pyrazoline-5-one is 1 to 0.01 to 1, wherein the active ingredients are in a ratio which is synergistic with respect to their anti-inflammatory activities.

3. The pharmaceutical composition of claim 2 wherein the ratio of the escin to the 1-phenyl-2,3-dimethyl-4-(2-bicyclo[2.2.1]heptyl)-amino - 3 - pyrazoline-5-one is 1 to 0.25.

4. The composition of claim 1 wherein the ratio is 1 to 0.01 to 0.5.

5. The pharmaceutical composition of claim 1 wherein the ratio of escin to the 1-phenyl-2,3-dimethyl-4-(2-bicyclo[2.2.1]heptyl-amino - 3-pyrazoline-5-one is from 1:1 to 1:5, and wherein the active ingredients are in a ratio which is hypoadditive with respect to their acute toxicities.

6. A method of relieving inflammation comprising administering orally a pharmaceutical composition containing as the active ingredients escin and 1-phenyl-2,3-dimethyl - 4-(2-bicyclo[2.2.1]heptyl)-amino-3-pyrazoline-5-one in a ratio of 1 to 0.01–20, respectively, in dosage units each including 25–30 mg. of the combined active ingredients to provide an average daily adult dosage of 120 to 250 mg. of such combined active ingredients, which amount is sufficient to relieve the inflammation.

7. The method of claim 6 wherein the ratio of the escin to the 1 - phenyl-2,3-dimethyl-4-(2-bicyclo[2.2.1] heptyl)-amino-3-pyrazoline-5-one is 1 to 0.01 to 1.

8. The method of claim 6 wherein the ratio of the escin to the 1 - phenyl-2,3-dimethyl-4-(2-bicyclo[2.2.1]heptyl)-amino-3-pyrazoline-5-one is 1 to 0.25.

9. The method of claim 8 wherein the ratio of the escin to the 1 - phenyl-2,3-dimethyl-4-(2-bicyclo[2.2.1]heptyl)-amino-3-pyrazoline-5-one is 1 to 0.01 to 0.5.

10. The method of claim 8 wherein the ratio of the escin to the 1 - phenyl-2,3-dimethyl-4-(2-bicyclo[2.2.1]heptyl)-amino-3-pyrazoline-5-one is 1 to 0.1 to 0.25.

11. The method of claim 5 wherein the ratio of escin to the pyrazoline is from 1:1 to 1:5.

References Cited

FOREIGN PATENTS 713,366  10/1968  Belgium.

OTHER REFERENCES

Chem. Abst., 67, 98815a (1967).
Chem. Abst., 68, 66088V (1968).

STANLEY J. FRIEDMAN, Primary Examiner

V. D. TURNER, Assistant Examiner

U.S. Cl. X.R.

424—273